United States Patent
Diehl et al.

(10) Patent No.: US 11,568,744 B2
(45) Date of Patent: Jan. 31, 2023

(54) SYSTEM AND METHOD FOR DETERMINING A STOP POINT

(71) Applicant: Pony AI Inc., Grand Cayman (KY)

(72) Inventors: Peter G. Diehl, Shanghai (CN); Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 188 days.

(21) Appl. No.: 16/569,435

(22) Filed: Sep. 12, 2019

(65) Prior Publication Data
US 2021/0082284 A1    Mar. 18, 2021

(51) Int. Cl.
| | |
|---|---|
| *G05D 1/00* | (2006.01) |
| *G08G 1/14* | (2006.01) |
| *B60W 30/18* | (2012.01) |
| *G06Q 10/02* | (2012.01) |
| *G06V 20/58* | (2022.01) |
| *G08G 1/137* | (2006.01) |

(52) U.S. Cl.
CPC ........... *G08G 1/137* (2013.01); *B60W 30/181* (2013.01); *B60W 30/18036* (2013.01); *G05D 1/0055* (2013.01); *G05D 1/0088* (2013.01); *G06Q 10/02* (2013.01); *G06V 20/58* (2022.01); *G06V 20/586* (2022.01); *G08G 1/141* (2013.01); *G05D 2201/0213* (2013.01)

(58) Field of Classification Search
CPC ...... G08G 1/137; G08G 1/141; G05D 1/0055; G05D 1/0088; G05D 2201/0213; G06K 9/00805; G06K 9/00812; G06Q 10/02; B60W 30/18036; B60W 30/181
See application file for complete search history.

(56) References Cited

U.S. PATENT DOCUMENTS

| | | | |
|---|---|---|---|
| 10,525,881 B1* | 1/2020 | Deshpande | B60Q 9/001 |
| 2012/0092191 A1* | 4/2012 | Stefik | G06Q 10/02 340/932.2 |
| 2014/0176349 A1* | 6/2014 | Smullin | G01C 21/3685 340/932.2 |
| 2014/0350854 A1* | 11/2014 | Sugimoto | G01C 21/3602 701/538 |
| 2016/0063862 A1* | 3/2016 | Rosen | G06Q 10/02 340/932.2 |
| 2016/0297431 A1* | 10/2016 | Eigel | B60W 30/06 |
| 2017/0129536 A1* | 5/2017 | Xu | B62D 6/001 |
| 2017/0191846 A1* | 7/2017 | Chintakindi | G06F 3/04847 |
| 2017/0267233 A1* | 9/2017 | Minster | B62D 15/02 |
| 2017/0286782 A1* | 10/2017 | Pillai | B60W 50/14 |
| 2018/0113470 A1* | 4/2018 | Iagnemma | G01C 21/30 |

(Continued)

FOREIGN PATENT DOCUMENTS

CN        107067798 A    *  8/2017

*Primary Examiner* — Jelani A Smith
*Assistant Examiner* — Frank T Glenn, III
(74) *Attorney, Agent, or Firm* — Sheppard Mullin Richter & Hampton LLP

(57) ABSTRACT

Provided herein is a system and method for a vehicle system on a vehicle. The system comprises a server comprising sensor data of stop points, one or more processors, and a memory storing instructions that, when executed by the one or more processors, cause the system to perform: determining, from the stop points, one or more available stop points; selecting, from the one or more available stop points, a stop point based on a criteria; and stopping the vehicle at the selected stop point.

20 Claims, 10 Drawing Sheets

(56) References Cited

U.S. PATENT DOCUMENTS

| | | | |
|---|---|---|---|
| 2018/0121833 A1* | 5/2018 | Friedman | G06Q 10/0631 |
| 2018/0211541 A1* | 7/2018 | Rakah | G08G 1/148 |
| 2018/0215376 A1* | 8/2018 | Kuhara | G06V 20/588 |
| 2018/0345955 A1* | 12/2018 | Kim | B60R 1/00 |
| 2018/0356821 A1* | 12/2018 | Kentley-Klay | G05D 1/0011 |
| 2019/0009904 A1* | 1/2019 | Winkle | G08G 5/025 |
| 2019/0361451 A1* | 11/2019 | Wilson | G08G 1/205 |
| 2020/0307557 A1* | 10/2020 | Noguchi | G05D 1/0088 |

* cited by examiner

SYSTEM AND METHOD FOR DETERMINING A STOP POINT

TECHNICAL FIELD

The present disclosure relates generally to vehicles such as autonomous vehicles (AVs) determining a viable stop point at which to pick up, drop off, or park and maneuvering to the stop point.

BACKGROUND

Vehicles such as autonomous vehicles (AVs) may transport passengers or items to destinations. At each destination, the vehicle determines a stop point at which to pick up or drop off passengers or items during a brief stop, or to park for a longer duration. The stop point should be legal, safe for the vehicle, safe for surrounding traffic, and safe for an owner of the vehicle. Currently, assistive parking or autonomous parking technologies may assist vehicles in parking. However, assistive parking or autonomous parking technologies do not look for a parking spot, pick up, or drop off point until the vehicle arrives at a destination. Therefore, vehicles spend time searching for a parking spot, pick up, or drop off point. Additionally, solely utilizing the vehicle's own sensors (camera, Lidar, radar, GPS, sonar, ultrasonic, IMU (inertial measurement unit), accelerometers, gyroscopes, magnetometers, and FIR (far infrared) sensors) may not allow the vehicle to locate a parking spot, pick up, or drop off point unless the vehicle is within a close proximity to the parking spot, pick up, or drop off point. These shortfalls are addressed by the present disclosures, which provides an efficient and effective system and method of finding a stop point (pick up, drop off location or parking), for example, before arriving at a destination.

SUMMARY

Described herein are systems and methods for a vehicle to determine a stop point, such as a parking spot, a drop off point or a pick up point. Various embodiments of the present disclosure provide a vehicle system on a vehicle. The vehicle system comprises a server comprising sensor data of stop points; one or more processors; and a memory storing instructions that, when executed by the one or more processors, cause the system to perform: determining, from the stop points, one or more available stop points; selecting, from the one or more available stop points, a stop point based on a criteria; and stopping the vehicle at the selected stop point.

In some embodiments, the sensor data of stop points comprises map and pictorial data from one or more sensors of the vehicle, one or more sensors of other vehicles, satellite maps, and road sensors.

In some embodiments, the criteria comprises a legality of the stop point, a safety for the vehicle, a safety for surrounding traffic, and a safety for an owner of the vehicle.

In some embodiments, the selecting the stop point based on the criteria comprises: selecting a desired destination and selecting, from the one or more available stop points, a stop point nearest the desired destination.

In some embodiments, the selecting the stop point based on the criteria comprises: selecting, from the available stop points, the stop point having a minimum difficulty of entry.

In some embodiments, the selecting the stop point based on the criteria comprises: reserving the selected stop point for a duration to notify other vehicles that the selected stop point is unavailable for the duration.

In some embodiments, the selecting the stop point based on the criteria comprises: eliminating a stop point that requires reverse parking in order to enter the stop point.

In some embodiments, the instructions further cause the system to perform: carrying out one or more additional precautions based on a condition of the stop point.

In some embodiments, the carrying out the one or more additional precautions comprises: rotating tires of the vehicle toward or away from a curb in response to a slope of a road at the stop point exceeding a threshold slope.

In some embodiments, the determining one or more available stop points comprises: requesting, by the vehicle, a stopping time for the vehicle to use the one or more available stop points; determining whether each of the one or more stop points has been reserved by another vehicle; in response to determining that one of the stop points has been reserved, determining whether a reservation time for which the one of the stop points has been reserved for the another vehicle coincides with the stopping time; and in response to determining that the reservation time coincides with the stopping time, determining that the one of the stop points is not available; and in response to determining that one of the stop points has not been reserved or that the reservation time does not coincide with the stopping time, determining that the one of the stop points is available.

Various embodiments of the present disclosure provide a method implemented by a vehicle system comprising a server including sensor data of stop points, one or more processors, and storage media storing machine-readable instructions, wherein the method is performed using the one or more processors. The method comprises: determining, from the stop points, one or more available stop points; selecting, from the one or more available stop points, a stop point based on a criteria; and stopping the vehicle at the selected stop point.

In some embodiments, the sensor data of stop points comprises map and pictorial data from one or more sensors of the vehicle, one or more sensors of other vehicles, satellite maps, and road sensors.

In some embodiments, the criteria comprises a legality of the stop point, a safety for the vehicle, a safety for surrounding traffic, and a safety for an owner of the vehicle.

In some embodiments, the selecting the stop point based on the criteria comprises selecting a desired destination and selecting, from the one or more available stop points, a stop point nearest the desired destination.

In some embodiments, the selecting the stop point based on the criteria comprises selecting, from the available stop points, the stop point having a minimum difficulty of entry.

In some embodiments, the selecting the stop point based on the criteria comprises reserving the selected stop point for a duration to notify other vehicles that the selected stop point is unavailable for the duration.

In some embodiments, the selecting the stop point based on the criteria comprises eliminating a stop point that requires reverse parking in order to enter the stop point.

In some embodiments, the method further comprises carrying out one or more additional precautions based on a condition of the stop point.

In some embodiments, the carrying out the one or more additional precautions comprises rotating tires of the vehicle toward or away from a curb in response to a slope of a road at the stop point exceeding a threshold slope.

In some embodiments, the determining one or more available stop points comprises: requesting, by the vehicle, a stopping time for the vehicle to use the one or more available stop points; determining whether each of the one or more stop points has been reserved by another vehicle; in response to determining that one of the stop points has been reserved, determining whether a reservation time for which the one of the stop points has been reserved for the another vehicle coincides with the stopping time; and in response to determining that the reservation time coincides with the stopping time, determining that the one of the stop points is not available; and in response to determining that one of the stop points has not been reserved or that the reservation time does not coincide with the stopping time, determining that the one of the stop points is available.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In general, a vehicle (e.g., an autonomous vehicle, a driverless vehicle, etc.) can have myriad sensors onboard the vehicle. The myriad sensors can include light detection and ranging sensors (or LiDARs), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, assisted parking, etc. For yet another example, cameras can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

Various embodiments overcome problems specifically arising in the realm of autonomous vehicle technology. Sensors on a vehicle may assist in finding a stop point (parking spot, drop off or pick up point). In various embodiments, the myriad sensors (e.g., LiDARs, radars, cameras, etc.) onboard the autonomous vehicle can be encased or housed in an enclosure. The enclosure allows the myriad sensors to be moved from one vehicle to another vehicle in a single act, rather than to move the myriad sensors one by one. In some embodiments, the enclosure can be installed or mounted onto a fixture of the autonomous vehicle. For example, the enclosure can be installed or mounted onto a roof rack or a custom rack fitted to the autonomous vehicle. The enclosure can be translated or moved along the fixture. In some embodiments, the enclosure is made of a material that is transparent to electromagnetic waves receptive to the myriad sensors encased by the enclosure. For example, the enclosure can be made from a transparent material that allows laser lights, radio waves, and visible lights emitted and/or received by the LiDARs, the radars, and the cameras, respectively, to enter and/or exit the enclosure.

Figure 1:
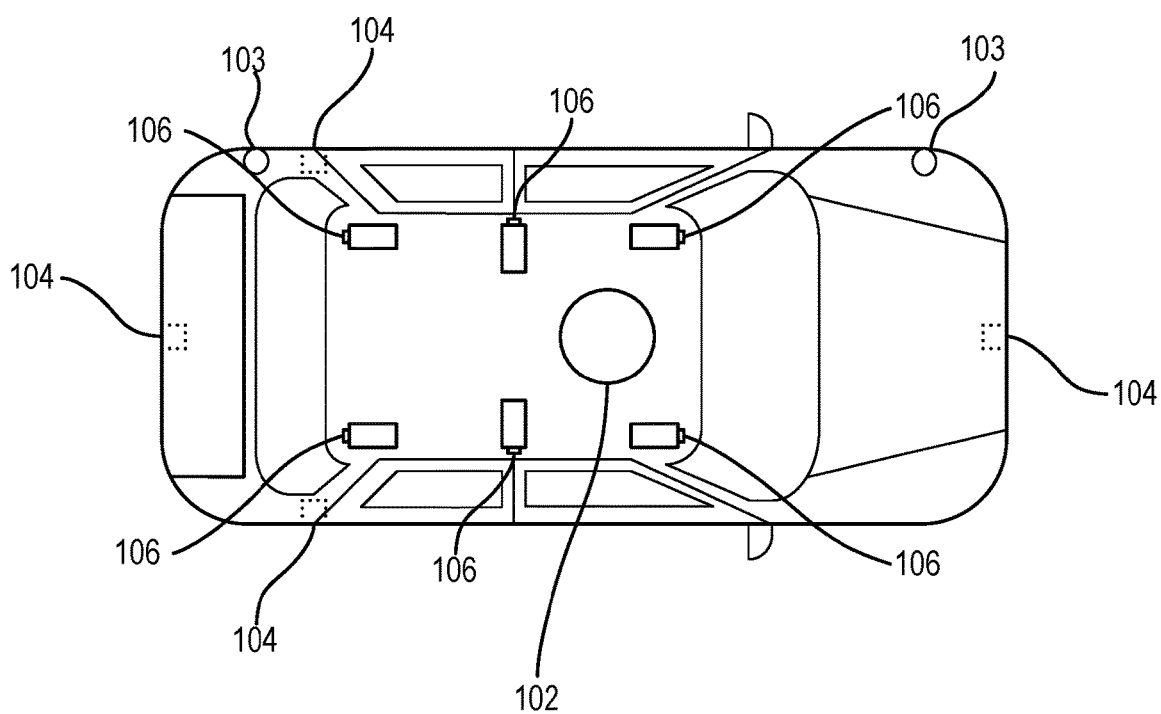
FIG. 1 illustrates an example vehicle (e.g., autonomous vehicle), according to an embodiment of the present disclosure.

FIG. 1 illustrates an example vehicle such as an autonomous vehicle 100, according to an embodiment of the present disclosure. A vehicle 100 generally refers to a category of vehicles that are capable of sensing and driving in a surrounding by itself. The vehicle 100 can include myriad sensors (e.g., LiDARs, radars, cameras, etc.) to detect and identify objects in the surrounding. Such objects may include, but are not limited to, pedestrians, road signs, traffic lights, and/or other vehicles, for example. The vehicle 100 can also include myriad actuators to propel and navigate the vehicle 100 in the surrounding. Such actuators may include, for example, any suitable electro-mechanical devices or systems to control a throttle response, a braking action, a steering action, etc. In some embodiments, the vehicle 100 can recognize, interpret, and analyze road signs (e.g., speed limit, school zone, construction zone, etc.) and traffic lights (e.g., red light, yellow light, green light, flashing red light, etc.). For example, the vehicle 100 can adjust vehicle speed based on speed limit signs posted on roadways. In some embodiments, the vehicle 100 can determine and adjust speed at which the vehicle 100 is traveling in relation to other objects in the surroundings. For example, the vehicle 100 can maintain a constant, safe distance from a vehicle ahead (e.g., adaptive cruise control). In this example, the vehicle 100 maintains this safe distance by constantly adjusting its vehicle speed to that of the vehicle ahead.

In various embodiments, the vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 100 can effectuate any control to itself that a human driver can on a conventional vehicle. For example, the vehicle 100 can accelerate, brake, turn left or right, or drive in a reverse direction just as a human driver can on the conventional vehicle. The vehicle 100 can also sense environmental conditions, gauge spatial relationships (e.g., distances between objects and itself), detect and analyze road signs just as the human driver. Moreover, the vehicle 100 can perform more complex operations, such as parallel parking, parking in a crowded parking lot, collision avoidance, etc., without any human input.

In various embodiments, the vehicle 100 may include one or more sensors. As used herein, the one or more sensors may include laser scanning systems (e.g., LiDARs) 102, ultrasonic sensors 103, radar systems 104, camera systems 106, GPS, sonar, IMU (inertial measurement unit), accelerometers, gyroscopes, magnetometers, FIR (far infrared) sensors, and/or the like. The one or more sensors allow the vehicle 100 to sense an environment around the vehicle 100. For example, the LiDARs 102 can generate a three-dimensional map of the environment. The LiDARs 102 can also detect objects in the environment. In another example, the radar systems 104 can determine distances and speeds of objects around the vehicle 100. In another example, the camera systems 106 can capture and process image data to detect and identify objects, such as road signs, as well as deciphering content of the objects, such as speed limit posted on the road signs.

In the example of FIG. 1, the vehicle 100 is shown with a LiDAR 102. The LiDAR 102 may be coupled to a roof or a top of the vehicle 100. As discussed, LiDARs such as LiDAR 102 can be configured to generate three dimensional maps of an environment and detect objects in the environment. In the example of FIG. 1, the vehicle 100 is shown with four radar systems 104. Two radar systems are coupled to a front-side and a back-side of the vehicle 100, and two radar systems are coupled to a right-side and a left-side of the vehicle 100. In some embodiments, the front-side and the back-side radar systems can be configured for adaptive cruise control and/or accident avoidance. For example, the front-side radar system can be used by the vehicle 100 to maintain a healthy distance from a vehicle ahead of the vehicle 100. In another example, if the vehicle ahead experiences a sudden reduction in speed, the vehicle 100 can detect this sudden change in motion and adjust its vehicle speed accordingly. In some embodiments, the right-side and the left-side radar systems can be configured for blind-spot detection. In the example of FIG. 1, the vehicle 100 is shown with six camera systems 106. Two camera systems are coupled to the front-side of the vehicle 100, two camera systems are coupled to the back-side of the vehicle 100, and two camera systems are couple to the right-side and the left-side of the vehicle 100. In some embodiments, the front-side and the back-side camera systems can be configured to detect, identify, and decipher objects, such as cars, pedestrian, road signs, in the front and the back of the vehicle 100. For example, the front-side camera systems can be utilized by the vehicle 100 to determine speed limits. In some embodiments, the right-side and the left-side camera systems can be configured to detect objects, such as lane markers. For example, side camera systems can be used by the vehicle 100 to ensure that the vehicle 100 drives within its lane.

Figure 2:
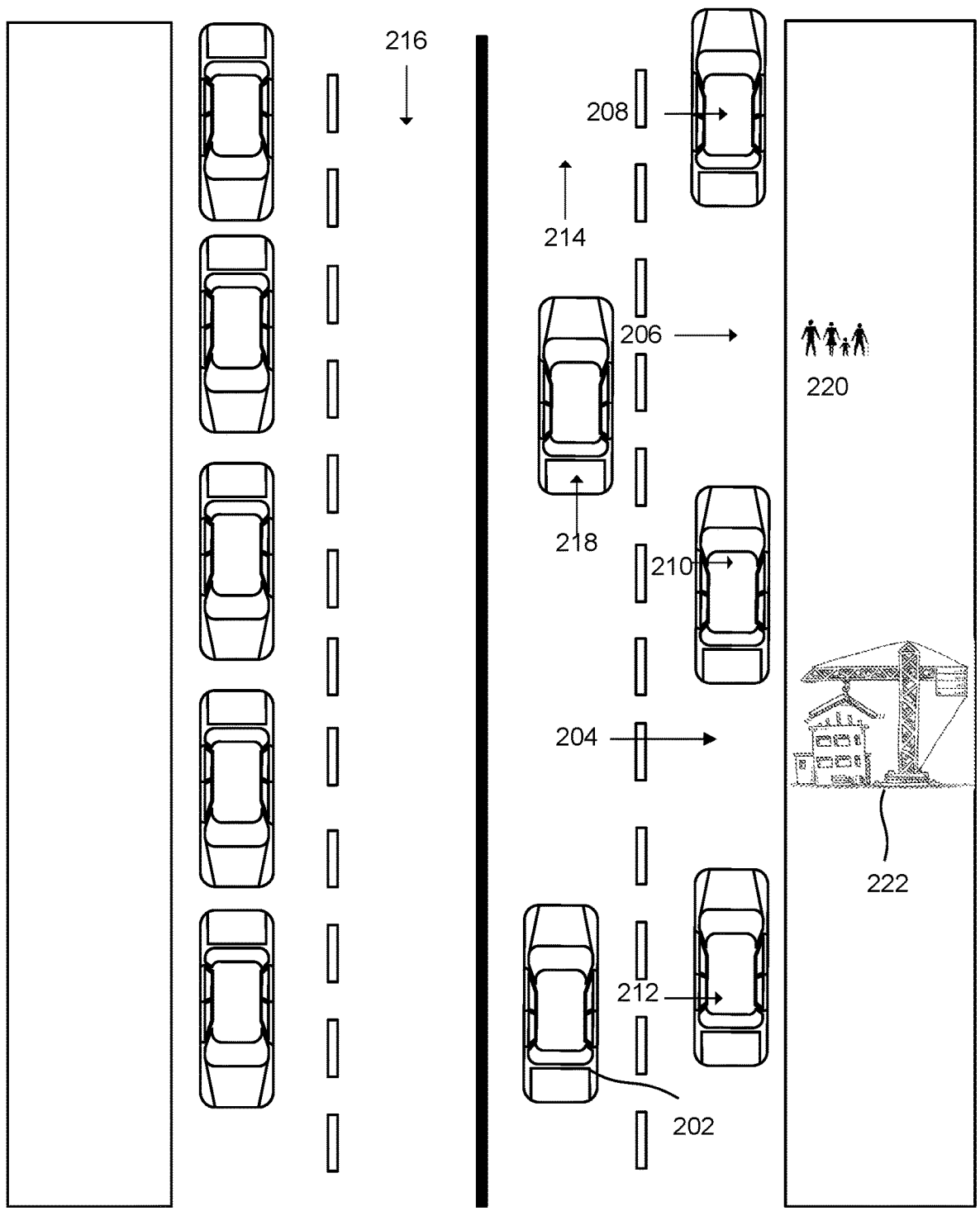
FIG. 2 illustrates an example diagram of a vehicle determining and selecting a stop point, according to an embodiment of the present disclosure.

FIG. 2 illustrates an example diagram of a vehicle 202 determining and selecting a stop point (parking spot, pick up or drop off point). In various embodiments, the vehicle 202 may be implemented as vehicle 100. The vehicle 202 may utilize its sensors including LiDAR, radar, camera, GPS, and/or ultrasonic sensors, as described with respect to the vehicle 100, to detect one or more stop points by analyzing gaps between stopped vehicles. In some embodiments, the vehicle 202 may utilize sensor data stored in a server connected to or accessed by the vehicle 100. The sensor data stored in the server may comprise map and pictorial data from one or more sensors of the vehicle 100, one or more sensors of other vehicles such as a vehicle 218, one or more satellite maps, and/or one or more road sensors such as sensors on traffic lights. In some examples, the vehicle 202 may initially utilize the sensors on the vehicle 202 itself, without using sensor data from other sources in the server, to try to find a stop point. If the vehicle 202 is unable to find a stop point using only the sensors on the vehicle 202 itself (for example, if the vehicle is too far from a destination or the vehicle's view of one or more stop points is obscured), the vehicle 202 may, in response, use some or all of the sensor data stored in the server. For example, the vehicle 202 may then use sensor data from other vehicles such as the vehicle 218. If the vehicle 202 is still unsuccessful in finding a stop point, the vehicle may, in response, use sensor data from one or more satellite maps. Next, if the vehicle 202 is still unsuccessful in finding a stop point, the vehicle may, in response, use sensor data from one or more road sensors. In some embodiments, the sensor data from distinct sources may be combined in the server.

The vehicle 202, using its sensors and/or other sensor data, may detect or determine one or more stop points 204, 206, 208, 210, and 212, on a side 214 of a road, as an example. The vehicle 202 may determine that the stop points 204 and 206 are available, while the stop points 208, 210, and 212 are occupied and unavailable. The vehicle 202 may further determine that no stop points on an opposite side 216 of the road are available. From the stop points determined to be available (204 and 206), the vehicle 202 may select one of the available stop points. The vehicle 202 may select a stop point based on a criteria. In some examples, the vehicle 202 may select a stop point satisfying a criteria including a legality of the stop point, a safety condition for the vehicle 202, a safety condition for surrounding traffic including pedestrians and other vehicles, and/or a safety condition for an owner of the vehicle 202. In some examples, the legality of the stop point may be dependent or based on how long the vehicle 202 is required to, or desires to, stop at the stop point, and on a type of the stop point. For example, the type of the stop point may indicate whether the stop point is intended for short-term stopping (for example, a pick up or drop off point) or long-term parking. For example, if the vehicle 202 is merely picking up or dropping off, the vehicle 202 may legally occupy either of a stop point intended for short-term stopping or a stop point intended for long-term parking. If the vehicle 202 requires, or requests, parking for a duration extending beyond that of a pick up or drop off, the vehicle 202 may not legally occupy a pick up or drop off point. In FIG. 2, for the sake of illustration, if the stop point 206 is a pick up or drop off point, the vehicle 202 cannot legally select the stop point 206 if the vehicle 202 intends to, or wishes, park for a duration extending beyond a duration of picking up or dropping off. As another example, the vehicle 202 may not use a bus stop as a stop point unless permitted by law.

In some examples, the vehicle 202, using its sensors and/or other sensor data, may select a stop point having a safest condition, or a highest safety, for the vehicle 202, surrounding traffic, and/or an owner of the vehicle 202. As an example, the vehicle 202 may detect a potentially unsafe condition for the vehicle 202 and/or the owner of the vehicle 202 adjacent a stop point and, in response, may not select that stop point. One potentially unsafe condition may be a crowd of people, shown for example as persons 220, standing adjacent a stop point (for example, stop point 206). The vehicle 202 may determine a degree of danger based on, for example, how long the persons 220 have been loitering or standing in a same area, actions that the persons 220 have been taking or have taken, objects or weapons that the persons 220 are possessing, and/or a number of persons 220 present adjacent the stop point 206.

In some examples, the vehicle 202, using its sensors and/or other sensor data, may detect a potentially unsafe condition for the vehicle 202, surrounding traffic, and/or an owner of the vehicle 202, for example, based on other events occurring adjacent a stop point. For example, the vehicle 202 may detect construction 222 which may cause an unsafe condition for the surrounding traffic (construction workers), the vehicle 202, and/or the owner of the vehicle 202. As another example, the vehicle 202 may detect nearby police activity as a potentially unsafe condition.

In some examples, the vehicle 202, using its sensors and/or other sensor data, may detect a potentially unsafe condition based on a smog level, a pollution level as measured by an air quality index (AQI), a noise level, an amount of lighting, and/or a temperature gradient (for example, which may indicate burning or a fire) adjacent a stop point. For example, the vehicle 202 may detect a potentially unsafe condition if the smog level, AQI, noise level, and/or the temperature gradient exceeds a threshold, and/or if an amount of lighting at night is less than a threshold. In some examples, the vehicle 202 may detect a potentially harmful object such as glass or garbage at a stop point as a potentially unsafe condition.

If the vehicle 202 detects a potentially unsafe condition, the vehicle 202 may assess a risk and/or severity of the potentially unsafe condition. In some embodiments, the vehicle 202 may select a stop point having a lowest risk and/or severity of potentially unsafe conditions. In some embodiments, the vehicle 202 may not select any stop point having a predetermined level risk and/or severity of an unsafe condition (e.g., above a threshold).

The vehicle 202 may, additionally or alternatively, select a stop point based on its proximity to a desired destination. The vehicle 202 may, additionally or alternatively, select a stop point having a minimum difficulty of entry. For example, the vehicle 202 may select a stop point that does not require reverse parking for entry. Thus, the vehicle 202 may not select the stop point 204.

The vehicle 202 may, additionally or alternatively, select a stop point based on one or more road conditions such as a slope or bumpiness. For example, the vehicle 202 may limit its selection of stop points to roads having a slope under a threshold, or roads having a bumpiness under a threshold (as measured, for example, by an IMU). As another example, the vehicle 202 may permit selection of a stop point on a road having a slope and enact a further precaution such as activating a parking brake or rotating tires of the vehicle toward or away from a curb in response to a slope of a road at the stop point in response to the slope of the road exceeding a threshold slope.

Figure 3:
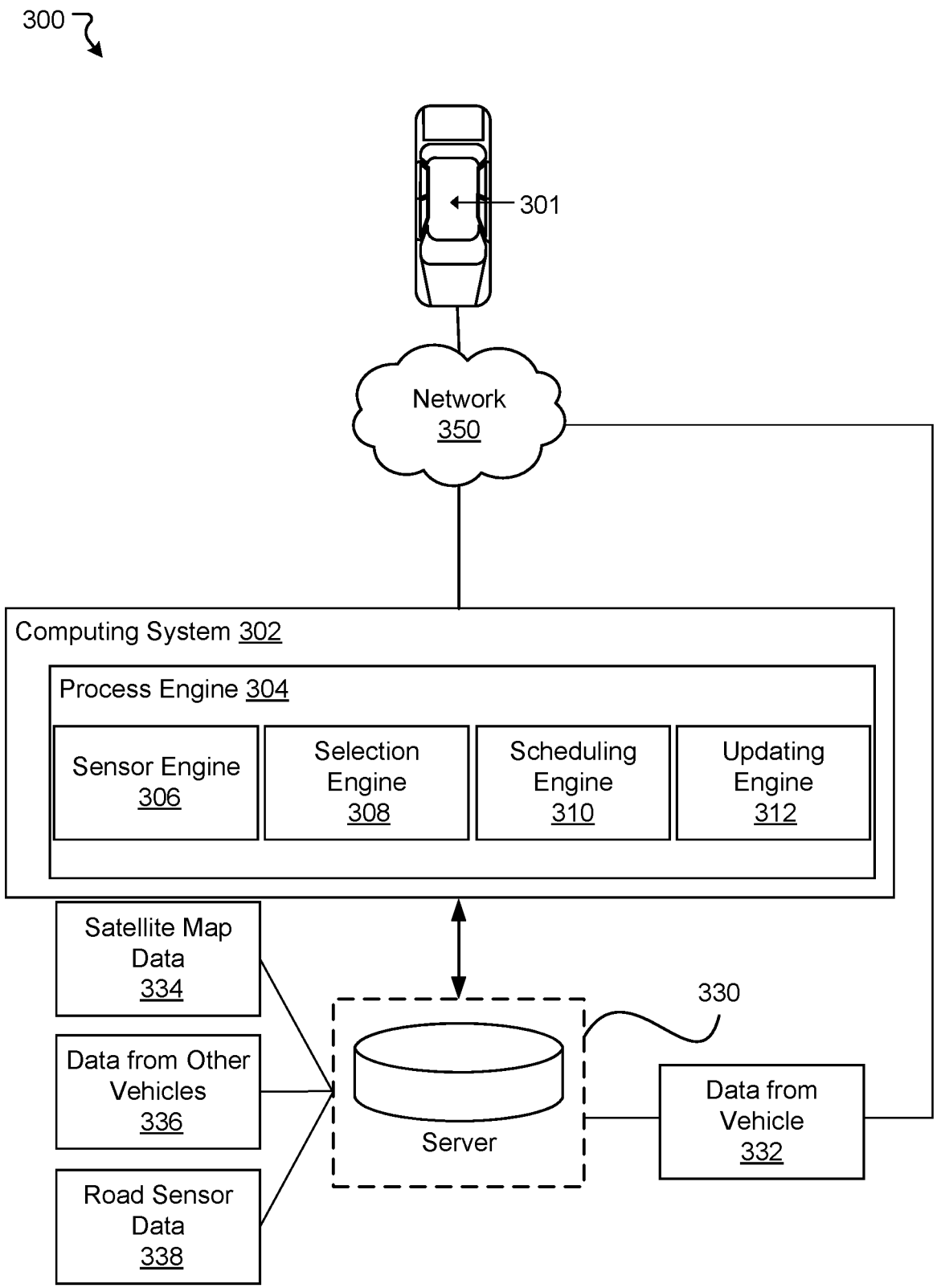
FIG. 3 illustrates an example environment of a vehicle system that determines and selects a stop point, according to an embodiment of the present disclosure.

FIG. 3 illustrates an example environment 300 of a vehicle system that determines and selects a stop point, in accordance with various embodiments. The example environment 300 may include a vehicle 301 which, for example, may be implemented as vehicle 202 or vehicle 100, and connected to at least one computing system 302 that includes one or more processors and memory. The processors may be configured to perform various operations by interpreting machine-readable instructions. In some embodiments, the example environment 300 may be implemented as a data platform. In some embodiments, the example environment 300 may be configured to interact with computing systems of the data platform. In various embodiments, one or more computing systems of the data platform may receive and process search queries to obtain sensor data, process the sensor data, determine stop points and available stop points, select a stop point, reserve a stop point, and/or update a status of stop points.

In some embodiments, the computing system 302 may include a process engine 304. The process engine 304 may include a sensor engine 306, a selection engine 308, a scheduling engine 310, and an updating engine 312. The process engine 304 may be executed by the processor(s) of the computing system 302 to perform various operations including those operations described in reference to the sensor engine 306, the selection engine 308, the scheduling engine 310, and the updating engine 312. In general, the process engine 304 may be implemented, in whole or in part, as software that is capable of running on one or more computing devices or systems. In one example, the process engine 304 may be implemented as or within a software application running on one or more computing devices (e.g., user or client devices) and/or one or more servers (e.g., network servers or cloud servers, servers 330). In some instances, various aspects of the sensor engine 306, the selection engine 308, the scheduling engine 310, and the updating engine 312 may be implemented in one or more computing systems and/or devices. In some instances, one or more of the sensor engine 306, the selection engine 308, the scheduling engine 310, and the updating engine 312 may be combined or integrated into a single processor, and some or all functions performed by one or more of the sensor engine 306, the selection engine 308, the scheduling engine 310, and the updating engine 312 may not be spatially separated, but instead may be performed by a common processor. The environment 300 may also include the one or more servers 330 accessible to the computing system 302. The one or more servers 330 may store pictorial and map data from the vehicle 301 (e.g., data from vehicle 332), one or more sensors of other vehicles (e.g., data from other vehicles 336), one or more satellite maps (e.g., satellite map data 334), and/or one or more road sensors such as sensors on traffic lights (e.g., road sensor data 338). In some embodiments, the one or more servers 330 may integrate data from different sensors. In other embodiments, the one or more servers 330 may keep the data from the different sensors separate. The one or more servers 330 may be accessible to the computing system 302 either directly or over a network 350. In some embodiments, the one or more servers 330 may store data that may be accessed by the process engine 304 to provide the various features described herein. In some instances, the one or more servers 330 may include federated data stores, databases, or any other type of data source from which data may be stored and retrieved, for example. In some implementations, the one or more servers 330 may include various types of data sets on which determinations of accuracy or consistency with other information can be made. In general, a user operating a computing device can interact with the computing system 302 over the network 350, for example, through one or more graphical user interfaces and/or application programming interfaces.

The sensor engine 306 may be configured to obtain sensor data, for example, from the one or more servers 330. The sensor engine 306 may continuously obtain the sensor data or obtain the sensor data at discrete time intervals. The sensor data may comprise pictorial or image data captured in either real-time or with a time delay. The sensor data may further comprise timestamp data indicating a time of capture of the sensor data. In some embodiments, the sensor engine 306, or a separate processing engine (not shown) may further process the obtained sensor data. The sensor data may comprise stop points. The sensor engine 306 may determine, from the obtained sensor data of the stop points, one or more available stop points. In some embodiments, the sensor engine 306 may determine that a stop point is available if the stop point is unoccupied by another vehicle or person.

The selection engine 308 may be configured to select a stop point from the one or more available stop points. As described with respect to the vehicle 202 in FIG. 2, the selection engine 308 may select a stop point based on certain criteria. Such criteria may include a legality of the stop point, a safety for the vehicle 301, a safety for surrounding traffic, and a safety for an owner of the vehicle 301. The selection engine 308 may, additionally or alternatively, select a stop point based on an ease of difficulty of entry. For example, if a stop point requires reverse parking to enter, the selection engine 308 may eliminate such a stop point from selection. The selection engine 308 may, additionally or alternatively, select a stop point based on a convenience (for example, if additional precautions are required). For example, if the stop point is situated on a slope, tires of the vehicle 301 should be turned toward or away from a curb. The selection engine 308 may exclude stop points for which additional precautions may be required, such as stop points situated on a slope.

The scheduling engine 310 may be configured to accept stop points from the selection engine 308, the sensor engine 306, or the one or more servers 330. The scheduling engine 110 may determine whether a stop point is available, reserve an available stop point for current and future use, while notifying other vehicles that a reserved stop point is unavailable while the stop point is being reserved. In some embodiments, the scheduling engine 310 may determine whether each of the one or more stop points has been reserved by another vehicle. In response to determining that one of the stop points has been reserved, the scheduling engine 310 may determine whether a reservation time for which that stop point has been reserved coincides with a duration requested by the vehicle 301. In response to determining that the reservation time coincides with the duration, the scheduling engine 310 may determine that the one of the stop points is unavailable. In response to determining that one of the stop points has not been reserved or that the duration does not coincide with the stopping time, the scheduling engine 310 may determine that the one of the stop points is available and reserve that stop point. Further details of the scheduling engine 310 will be provided in FIG. 4.

The updating engine 312 may be configured to update a status of stop points to keep track of whether a stop point is currently in use or reserved for use. For example, the updating engine 312 may be configured to pictorially update a display or chart indicating a the status of stop points.

Figure 4:
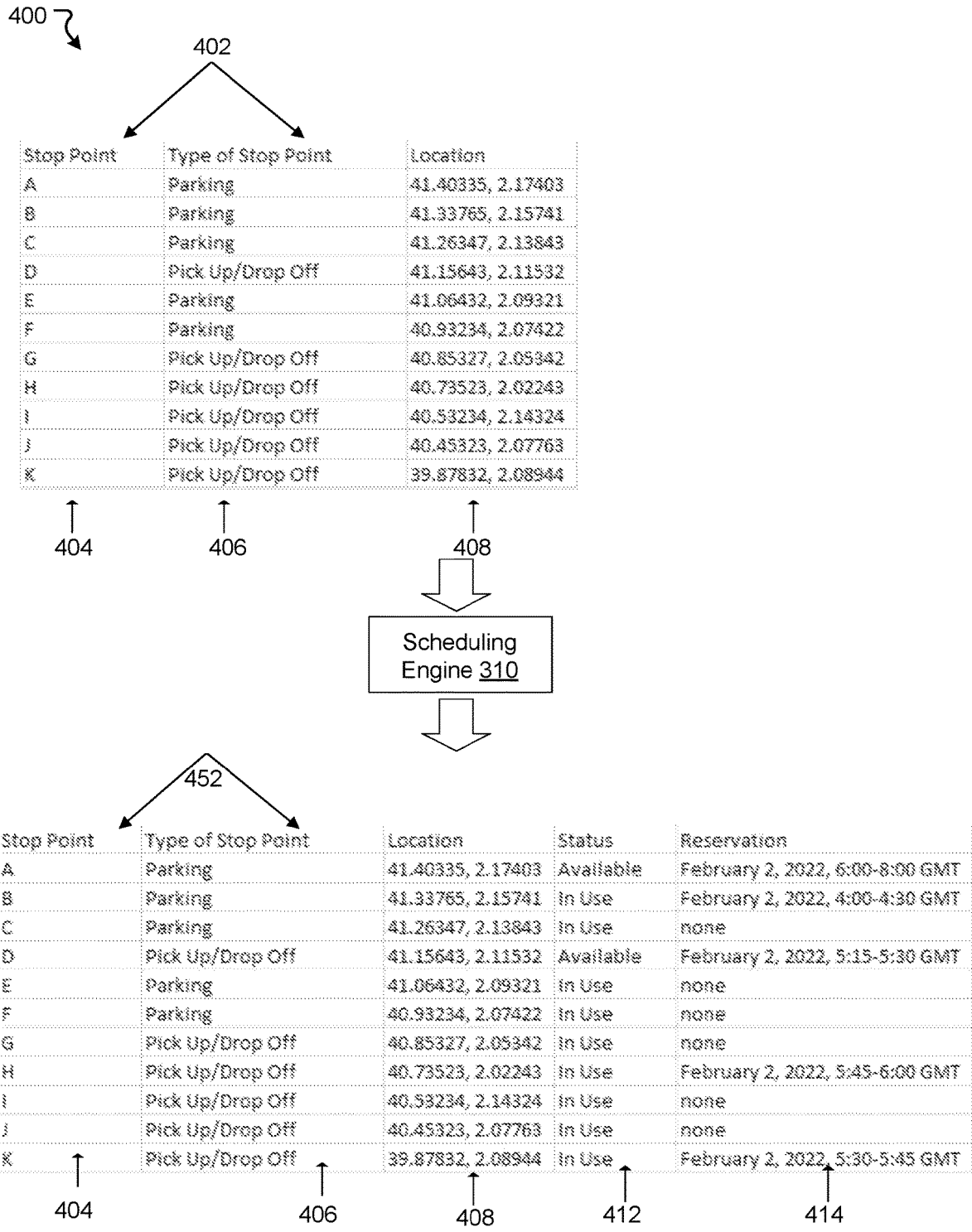
FIG. 4 illustrates an example operation of a scheduling engine, according to an embodiment of the present disclosure.

FIG. 4 illustrates an example operation 400 of the scheduling engine 310. The scheduling engine 310 may accept information 402 regarding stop points 404 at or near a specific destination, types 406 of the respective stop points (whether each stop point is a long-term parking spot or only a pick-up or drop-off point), and respective location coordinates 408 for each of the stop points. The scheduling engine 310 may process the information 402 and track, update, and output status and scheduling information 452. The status and scheduling information 452 may comprise the information 402 regarding stop points at or near a specific destination, the types of the respective stop points 404 (whether each stop point is a long-term parking spot or only a pick-up or drop-off point), the respective location coordinates 408 for each of the stop points, status information 412 of each of the stop points 404, and reservation information 414 of each of the stop points 404. In some embodiments, the status information 412 indicates a current status of each of the stop points 404, for example, whether or not a stop point is currently occupied by another vehicle or person. In some embodiments, the reservation information 414 shows all future reservations of the stop point by other vehicles. The information presented in FIG. 4 is merely a non-limiting example shown for illustrative purposes.

To successfully reserve a stop point, the vehicle 301 sends information to the scheduling engine 310 regarding a desired time to reserve a stop point. For example, the vehicle 301 may request a stop point for use from a current time (for example, 3:00 GMT) until 5:00 GMT. The scheduling engine 310 may find any stop points of type "parking" that are currently available and not reserved from 3:00 GMT until 5:00 GMT, and determine that stop point A fits the aforementioned criteria. The scheduling engine may then reserve the stop point A for use from 3:00 GMT until 5:00 GMT.

If a stop point is reserved for use, for example, from 3:00 GMT until 5:00 GMT, but no vehicle appears at the stop point at 3:00 GMT, the scheduling engine 310 may cancel the reservation if no vehicle appears after a certain amount of time (for example, 5 minutes or 15 minutes) after 3:00 GMT. That stop point would then be available for use for other vehicles.

Figure 5A:
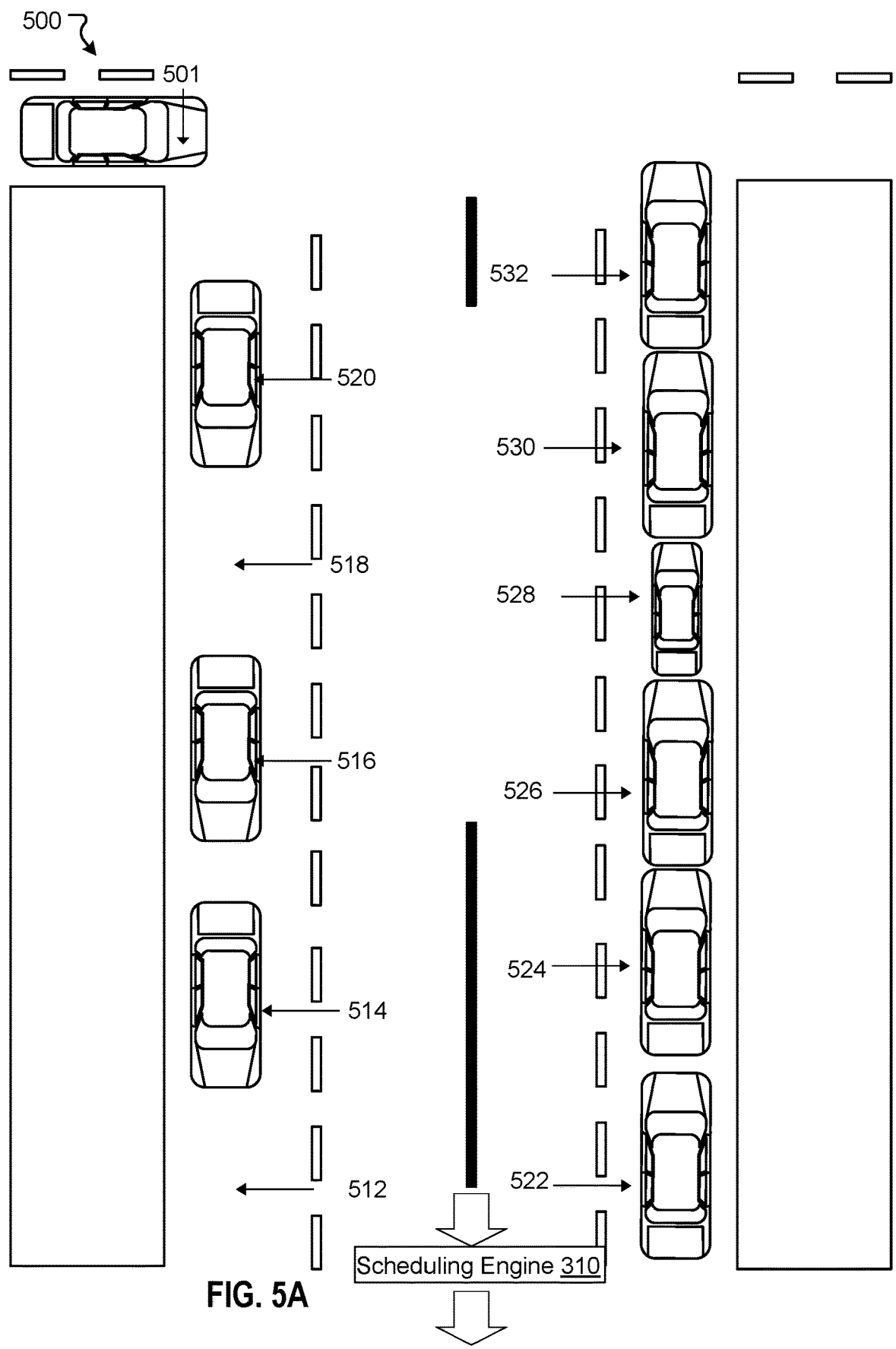
FIG. 5A illustrates an example operation of a scheduling engine, according to an embodiment of the present disclosure.
Figure 5A:
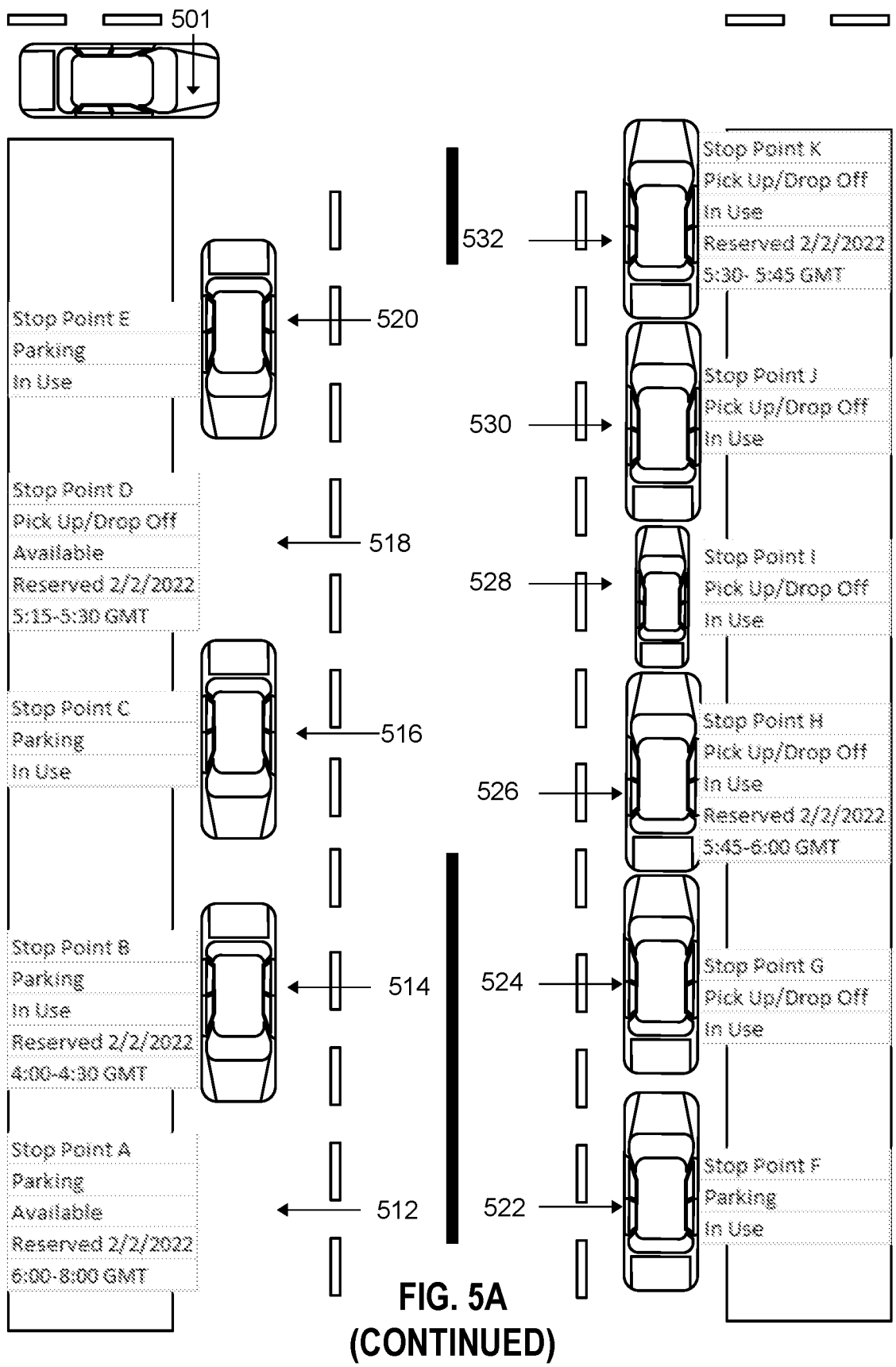

FIG. 5A illustrates an example operation 500 of the scheduling engine 310. The scheduling engine 310 may accept map data from a vehicle 501, which may be implemented as a vehicle 301, 202, and 100. The scheduling engine 310 may, alternatively or additionally, accept map data from one or more other vehicles, one or more satellite maps, and/or one or more road sensors such as a traffic light. The map data may include stop points 512, 514, 516, 518, 520, 522, 524, 526, 528, 530, and 532. The scheduling engine 310 may process, track, and output status and scheduling information for each of the stop points 512, 514, 516, 518, 520, 522, 524, 526, 528, 530, and 532 and display and/or notify a user of the status and scheduling information. For each of the stop points 512, 514, 516, 518, 520, 522, 524, 526, 528, 530, and 532, the scheduling engine 310 may output types of the respective stop points (whether each stop point is a long-term parking spot or only a pick-up or drop-off point), status information of each of the stop points indicating whether a stop point is currently in use or available, and reservation information of each of the stop points indicating whether and when a stop point is reserved. A user may visualize on a map the status information and the reservation information of each stop point at or near a destination to assist in selecting a stop point. To successfully reserve a stop point, the vehicle 501 sends information to the scheduling engine 310 regarding a desired time to reserve a stop point. For example, the vehicle 501 may request a stop point for use from a current time (for example, 3:00 GMT) until 5:00 GMT. The scheduling engine 310 may find any stop points of type "parking" that are currently available and not reserved from 3:00 GMT until 5:00 GMT, and determine that stop point A fits the aforementioned criteria. The scheduling engine may then reserve the stop point A for use from 3:00 GMT until 5:00 GMT. If a stop point is reserved for use, for example, from 3:00 GMT until 5:00 GMT, but no vehicle appears at the stop point at 3:00 GMT, the scheduling engine 310 may cancel the reservation if no vehicle appears after a certain amount of time (for example, 5 minutes or 15 minutes) after 3:00 GMT. That stop point would then be available for use for other vehicles. The information presented in FIG. 5 is merely a non-limiting example shown for illustrative purposes.

Figure 5B:
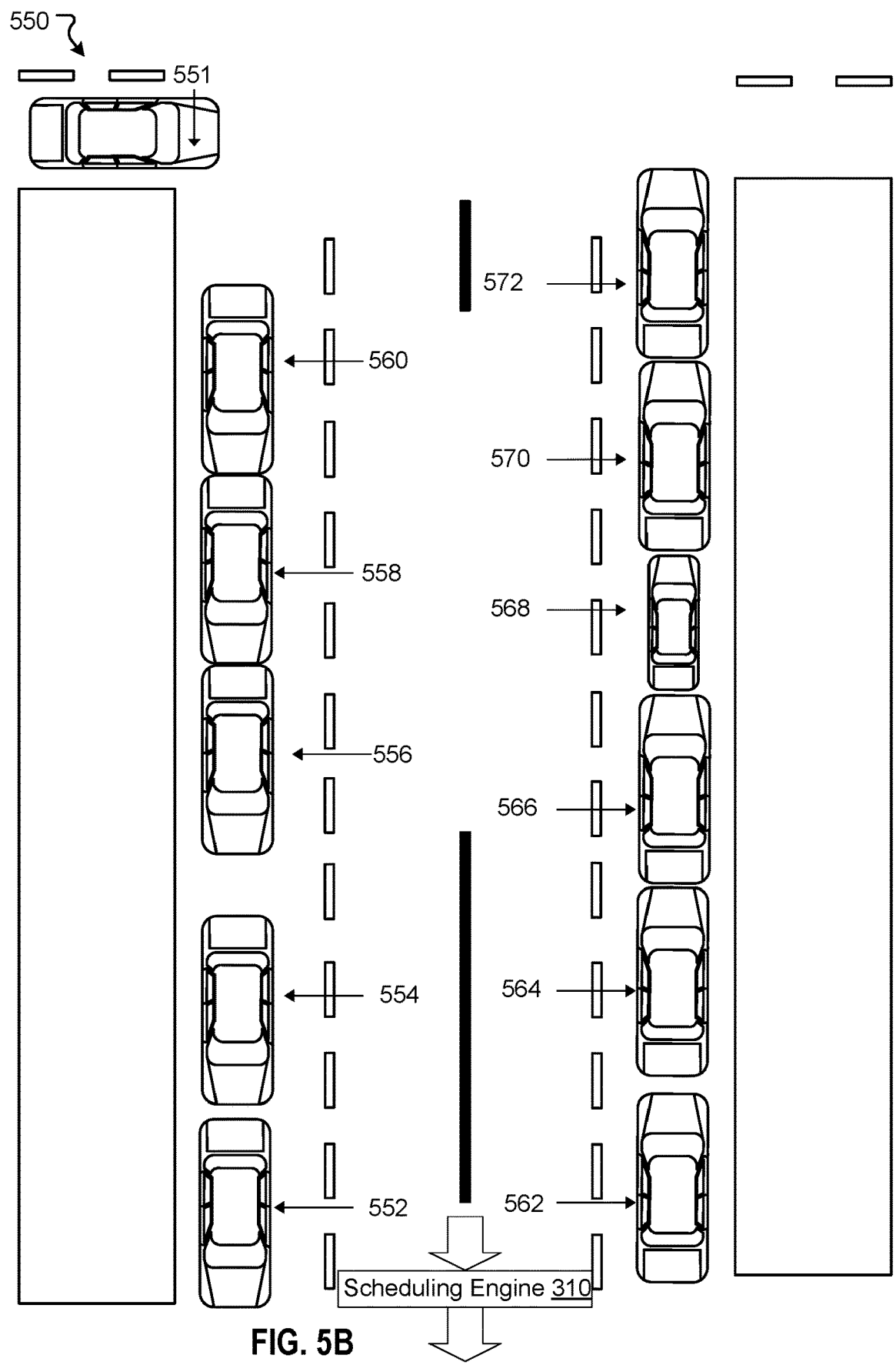
FIG. 5B illustrates an example operation of a scheduling engine, according to an embodiment of the present disclosure.
Figure 5B:
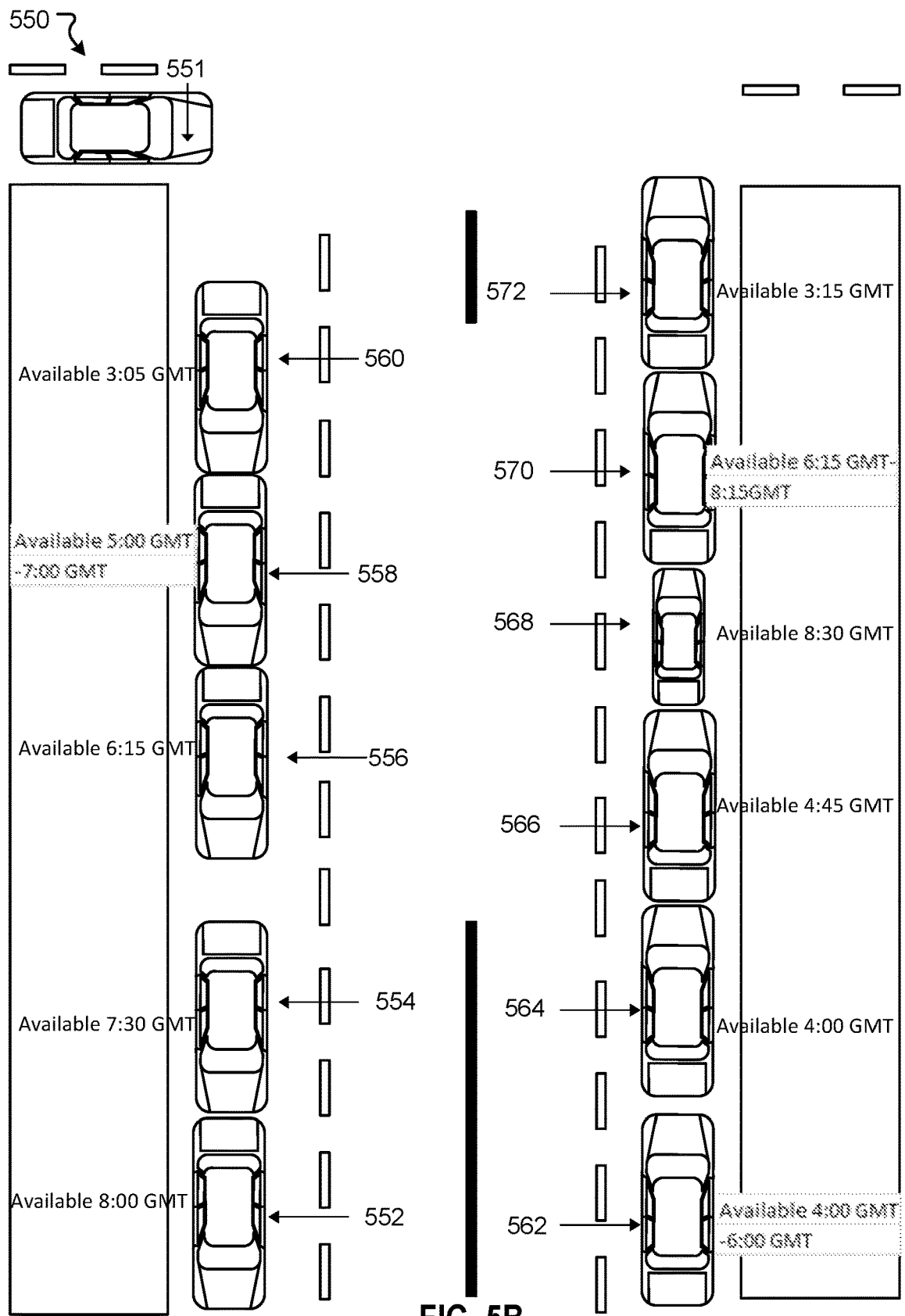

FIG. 5B illustrates an example operation 550 of the scheduling engine 310 of a vehicle 551. The scheduling engine 310 may accept map data from the vehicle 551, which may be implemented as a vehicle 301, 202, or 100. The scheduling engine may, additionally or alternatively, accept map data from one or more other vehicles, one or more satellite maps, and/or one or more road sensors such as a traffic light. The map data may include stop points 552, 554, 556, 558, 560, 562, 564, 566, 568, 570, and 572. The scheduling engine 310 may process, track, and output status and scheduling information for each of the stop points 552, 554, 556, 558, 560, 562, 564, 566, 568, 570, and 572 and display and/or notify a user of the status and scheduling information. As an example, if all the stop points 552, 554, 556, 558, 560, 562, 564, 566, 568, 570, and 572 are currently occupied, the scheduling engine 310 may output and/or provide information regarding when each of the stop points, and a duration of time in which, each of the stop points becomes available. A user of the vehicle 551, for example, may have knowledge of when and where a stop point will become available. Thus, if the vehicle 551 is searching for a stop point, the vehicle 551 will be notified that the stop point 560 will become available at 3:05 GMT (five minutes from a current time) and be able to occupy the stop point 560 at that time. Additionally, if a current vehicle is occupying a stop point and has reserved the stop point for a certain duration, if no other vehicles reserve the stop point, the current vehicle may be allowed to remain past the duration. For example, if no other vehicle reserves the stop point 556 at 6:15 GMT, or otherwise requests a stop point by 6:15 GMT, a vehicle currently occupying the stop point 556 may remain after 6:15 GMT, until another vehicle reserves or requests the stop point 556.

Figure 6:
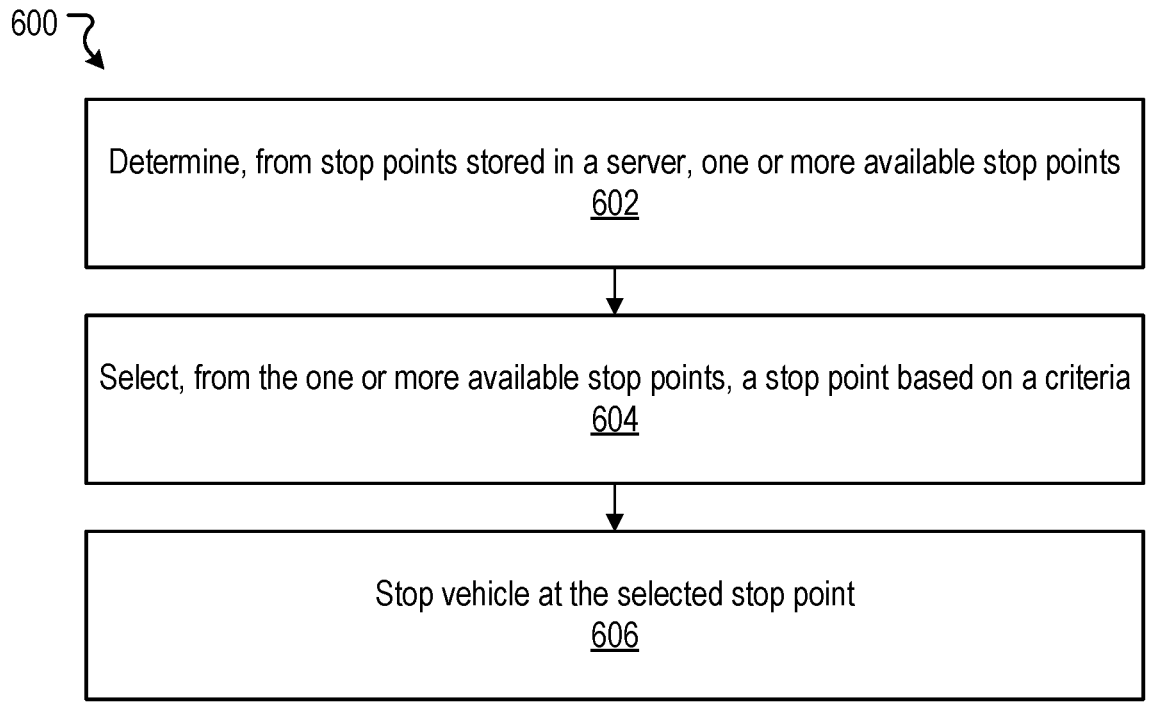
FIG. 6 illustrates an flowchart of an example of a method to determine and select a stop point, according to some embodiments.

FIG. 6 illustrates a flowchart of a method to determine and select a stop point according to some embodiments. In this and other flowcharts, the flowchart 600 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 6.

In step 602, one or more available stop points may be determined from stop points stored in a server. For example, out of the stop points stored in the server, a system or processor may determine which of the stop points are available. In step 604, a stop point may be selected from the one or more available stop points, based on a criteria. In step 606, a vehicle may be stopped at the selected stop point.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
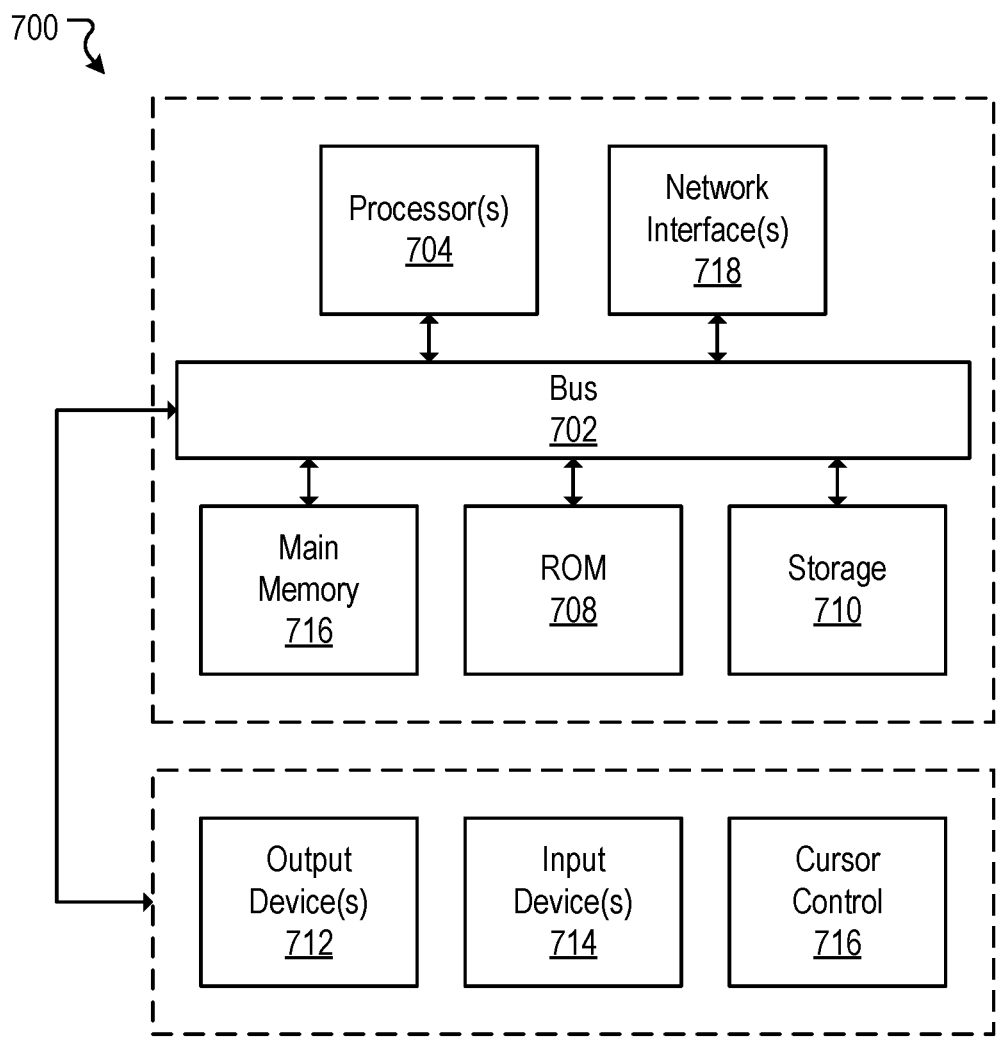
FIG. 7 is a diagram of an example computer system for implementing the features disclosed herein.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to output device(s) 712, such as a cathode ray tube (CRT) or LCD display (or touch screen), for displaying information to a computer user. Input device(s) 714, including alphanumeric and other keys, are coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A vehicle system on a vehicle, comprising:
    a server comprising sensor data of stop points wherein the server consolidates the sensor data from different vehicles;
    one or more processors; and
    a memory storing instructions that, when executed by the one or more processors, cause the system to perform:
        determining, from the stop points, one or more available stop points;
        selecting, from the one or more available stop points, a stop point among the available stop points having among a lowest degree of danger, wherein a degree of danger of a particular stop point is based on:
            a detection of persons loitering adjacent to the stop point,
            a density of the persons, and
            respective durations at which the persons have been loitering adjacent to the stop point; and
        stopping the vehicle at the selected stop point.

2. The vehicle system of claim 1, wherein selecting the stop point comprises:
    selecting a desired destination and selecting, from the one or more available stop points, a stop point nearest the desired destination.

3. The vehicle system of claim 1, wherein selecting the stop point comprises:
    selecting, from the available stop points, the stop point having a minimum difficulty of entry.

4. The vehicle system of claim 1, wherein selecting the stop point comprises:
reserving the selected stop point for a duration to notify other vehicles that the selected stop point is unavailable for the duration.

5. The vehicle system of claim 3, wherein selecting the stop point comprises:
eliminating a stop point that requires reverse parking in order to enter the stop point.

6. The vehicle system of claim 1, wherein the instructions further cause the system to perform:
rotating tires of the vehicle toward or away from a curb in response to a slope of a road at the stop point exceeding a threshold slope.

7. The vehicle system of claim 1, wherein determining one or more available stop points comprises:
requesting, by the vehicle, a stopping time for the vehicle to use the one or more available stop points;
determining whether each of the one or more stop points has been reserved by another vehicle;
in response to determining that one of the stop points has been reserved, determining whether a reservation time for which the one of the stop points has been reserved for the another vehicle coincides with the stopping time;
in response to determining that the reservation time coincides with the stopping time, determining that the one of the stop points is not available; and
in response to determining that one of the stop points has not been reserved or that the reservation time does not coincide with the stopping time, determining that the one of the stop points is available.

8. The system of claim 1, wherein selecting the stop point is further based on a duration that a subset of the persons has been present adjacent the stop point.

9. The system of claim 1, wherein selecting the stop point is further based on an air quality index (AQI) adjacent to the stop point, a noise level, and an amount of lighting adjacent to the stop point.

10. The system of claim 1, wherein selecting the stop point is further based on an absence of police activity or construction activity adjacent to the stop point.

11. The system of claim 1, wherein the instructions further cause the system to perform: in response to determining that one of the stop points has been reserved but the another vehicle has failed to appear at the one of the stop points within a threshold time of the reservation time, cancelling the reservation time and determining that the one of the stop points is available.

12. The system of claim 1, wherein selecting the stop point is further based on a presence or absence of broken glass on a ground adjacent to the stop point.

13. The system of claim 1, wherein selecting the stop point is further based on whether the stop point is intended for short-term stopping or long-term parking, and a duration for which the vehicle intends to stop.

14. The system of claim 1, wherein the degree of danger of a particular stop point is further determined based on one or more weapons carried by the persons loitering adjacent to the stop point.

15. The system of claim 1, wherein the selecting of the stop point is further based on a level of safety for one or more surrounding construction workers.

16. The system of claim 1, wherein the selecting of the stop point is based on a temperature gradient at or adjacent to the stop point.

17. A method implemented by a vehicle system comprising a server including sensor data of stop points; one or more processors; and storage media storing machine-readable instructions, wherein the method is performed using the one or more processors, the method comprising:
determining, from the stop points, one or more available stop points;
selecting, from the one or more available stop points, a stop point among the available stop points having among a lowest degree of danger, wherein a degree of danger of a particular stop point is based on:
a detection of persons loitering adjacent to the stop point,
a density of the persons, and
respective durations at which the persons have been loitering adjacent to the stop point; and
stopping the vehicle at the selected stop point.

18. The method of claim 17, wherein selecting the stop point comprises eliminating a stop point that requires reverse parking in order to enter the stop point.

19. The method of claim 17, further comprising rotating tires of the vehicle toward or away from a curb in response to a slope of a road at the stop point exceeding a threshold slope.

20. The method of claim 17, wherein determining one or more available stop points comprises:
requesting, by the vehicle, a stopping time for the vehicle to use the one or more available stop points;
determining whether each of the one or more stop points has been reserved by another vehicle;
in response to determining that one of the stop points has been reserved, determining whether a reservation time for which the one of the stop points has been reserved for the another vehicle coincides with the stopping time; and
in response to determining that the reservation time coincides with the stopping time, determining that the one of the stop points is not available; and
in response to determining that one of the stop points has not been reserved or that the reservation time does not coincide with the stopping time, determining that the one of the stop points is available.

* * * * *